(12) United States Patent
Brown et al.

(10) Patent No.: US 7,635,085 B2
(45) Date of Patent: Dec. 22, 2009

(54) COMMERCIAL CURRENCY HANDLING AND SERVICING MANAGEMENT

(75) Inventors: Brian Duane Brown, Matthews, NC (US); Anthony B. Calderone, Matthews, NC (US); Henry W. Debnam, Waxhaw, NC (US); Shane Anthony Johnson, Charlotte, NC (US); Bethann Johnston, Atlanta, GA (US); Michelle Davis Nichols, Rock Hill, SC (US); John Daniel Shaver, Charlotte, NC (US); John N. Venzon, Davidson, NC (US); John Scott Walbert, Mooresville, NC (US); Margaret Morgan Weichert, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 11/614,656

(22) Filed: Dec. 21, 2006

(65) Prior Publication Data

US 2008/0149706 A1    Jun. 26, 2008

(51) Int. Cl.
*G06Q 40/00* (2006.01)
*G07D 11/00* (2006.01)
*G07F 19/00* (2006.01)

(52) U.S. Cl. ................ 235/379; 705/42; 705/43; 705/44; 705/45

(58) Field of Classification Search ............ 235/379; 705/42–45
See application file for complete search history.

(56) References Cited

U.S. PATENT DOCUMENTS

| 6,848,612 | B2 | 2/2005 | Uematsu et al. | |
|---|---|---|---|---|
| 6,983,836 | B2 | 1/2006 | Adams et al. | |
| 2001/0020638 | A1* | 9/2001 | Uematsu et al. | 235/379 |
| 2001/0054643 | A1 | 12/2001 | Siemens | |
| 2003/0083969 | A1 | 5/2003 | Uchiyama et al. | |
| 2005/0080731 | A1 | 4/2005 | Snyaneshwar | |
| 2005/0108164 | A1* | 5/2005 | Salafia et al. | 705/42 |
| 2006/0022032 | A1* | 2/2006 | Fillinger et al. | 235/379 |
| 2007/0045395 | A1* | 3/2007 | Corona et al. | 235/379 |
| 2007/0063016 | A1 | 3/2007 | Myatt et al. | |

FOREIGN PATENT DOCUMENTS

| EP | 1486923 | 12/2004 |
|---|---|---|
| WO | 2005038623 | 4/2005 |

OTHER PUBLICATIONS

International Preliminary Report on Patentability for International Application No. PCT/US2007/088650 dated Jun. 24, 2009, 6 pages.
International Search Report and Written Opinion for International Application No. PCT/US2007/088650 mailed Sep. 16, 2008, 10 pages.

* cited by examiner

*Primary Examiner*—Thien M. Le
*Assistant Examiner*—Tuyen K Vo
(74) *Attorney, Agent, or Firm*—Banner & Witcoff, Ltd.

(57) ABSTRACT

Aspects of the invention provide for an end-to-end currency handling, and servicing apparatus. The apparatus may be used in any cash-centric business or enterprise for cash register till set up and balancing, back office reconciliation, and other cash payment handling activities. Further aspects of the invention provide real-time access to cash receipts for enterprise use in making financial and planning decisions.

32 Claims, 13 Drawing Sheets

FIG. 9

| ID | Denomination | Count | Total | Status |
|---|---|---|---|---|
| G | 0 EUR | 0 | 0 EUR | Not ready, locked |
| H | 0 EUR | 0 | 0 EUR | Not ready, locked |
| F | $ 100 | 46 | $ 4,600 | OK |
| E | $ 50 | 90 | $ 4,500 | OK |
| D | $ 20 | 17 | $ 340 | OK |
| A | $ 10 | 10 | $ 100 | OK |
| B | $ 5 | 23 | $ 115 | OK |
| C | $ 1 | 45 | $ 45 | OK |
| Total Stock in EUR | | 0 | 0.00 EUR | |
| Total Stock in USD | | 231 | $ 9,700.00 | |

COMMERCIAL CURRENCY HANDLING AND SERVICING MANAGEMENT

FIELD OF THE INVENTION

Aspects of the disclosure relate to cash handling in a cash-centric environment. More specifically, aspects of the invention relate to real-time access to information regarding cash flows.

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow.

A starting point for proper cash flow management involves use of cash flow projections. Accurate cash flow projections enable business mangers to make proper decisions regarding day-to-day operations and long-term strategic decisions such as investment decisions.

Good cash flow projections involve using up-to-date accurate data regarding inflows and outflows of cash over a period of time. These projections which may be in the form of cash flow statements involve estimation of operating cash flow. However, timely up-to-date data concerning operating cash flow is difficult to obtain in large retail operations. In large retail operations, accurate cash flow data may not be known until business close, as an accounting of each cash register's drawer has to be completed and reported to a corporate back office.

For example, a multi-store grocery chain may have multiple cashiers at each store handling numerous customers during a business day. When each store closes or at the end of the cashier's shift, each of the cashiers may have to tally in their cash register so that a final tally may be determined each store closing. At certain time of day the result may be forwarded to a central office which may be used to calculate cash flow for the grocery chain.

At particular scheduled times which may range from daily to once every few days or longer, an armored car or other means of transportation may be arranged such that cash receipts from the day or some other period of time may be picked up and transferred to a financial center or branch for deposit. Upon delivery to the financial center, cash may be deposited and may be made available for use by the business in another one to four business days.

Therefore, a need exists for a method, apparatus, and system for calculating and allowing use of cash flows for a business or enterprise in real-time. The calculation of real-time cash flows may enable mangers with cash management responsibilities to make informal business decisions regarding use of cash during the same business day for the entire enterprise.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect of the invention, an end-to-end currency, handling and servicing apparatus is provided to any cash-centric business or enterprise. In various embodiments, the method, apparatus, and system may provide cash register till set up and balancing, back office reconciliation, and other cash payment handling activities.

In an aspect of the invention, a cash recycling apparatus is utilized to receive currency deposits and recycle the deposited currency for withdrawals. In an embodiment, the cash recycling apparatus may scan each deposit for counterfeits bills.

In another aspect of the invention, a currency recycling apparatus may be placed in each of a business customer's stores or locations. The currency recycling machines may be networked. In an embodiment, after each cashier shift or at other designated times, contents of a cashier's register till or drawer may be deposited into a currency recycling apparatus. In another embodiment, at shift start the currency recycling apparatus may withdraw a determined amount of cash in various denominations so as to stock a cashier's cash register till or drawer.

Furthermore, in an aspect of the invention contents and data from each of the networked currency recycling machines may be analyzed to determine real-time cash positions. In an embodiment, the real-time cash positions may be used to make projections and/or decisions regarding short and long term business decisions.

In yet another aspect of the invention, each of the currency recycling machines may be connected to a financial institution's network or infrastructure. In an embodiment, each deposit or withdrawal via the currency recycling machine may be credited or debited real-time to a customer's account. In another embodiment, real-time crediting and debiting of a customer's account may allow the customer to have immediate access to the customer's recent deposits and current balance for use in future transactions or for planning and forecasting.

BRIEF DESCRIPTION OF THE DRAWINGS

The present disclosure is illustrated by way of example and not limited in the accompanying figures in which like reference numerals indicate similar elements.

FIG. 9 illustrates a report that may be generated and used in accordance with an aspect of the invention.

DETAILED DESCRIPTION

In accordance with various aspects of the disclosure, systems and methods are illustrated for providing currency handling services and management. A financial institution such as a bank may provide immediate access and use of funds recently deposited using the currency handling apparatus, system, and method described below in various aspects of the invention. For illustrative purposes the financial instrument discussed throughout the below description is cash. However, as those skilled in the art will realize, the described aspects of the invention are not limited to just cash (paper money and coins) and but may also include other forms of liquid assets such as checks, bank notes, and money orders.

Figure 1:
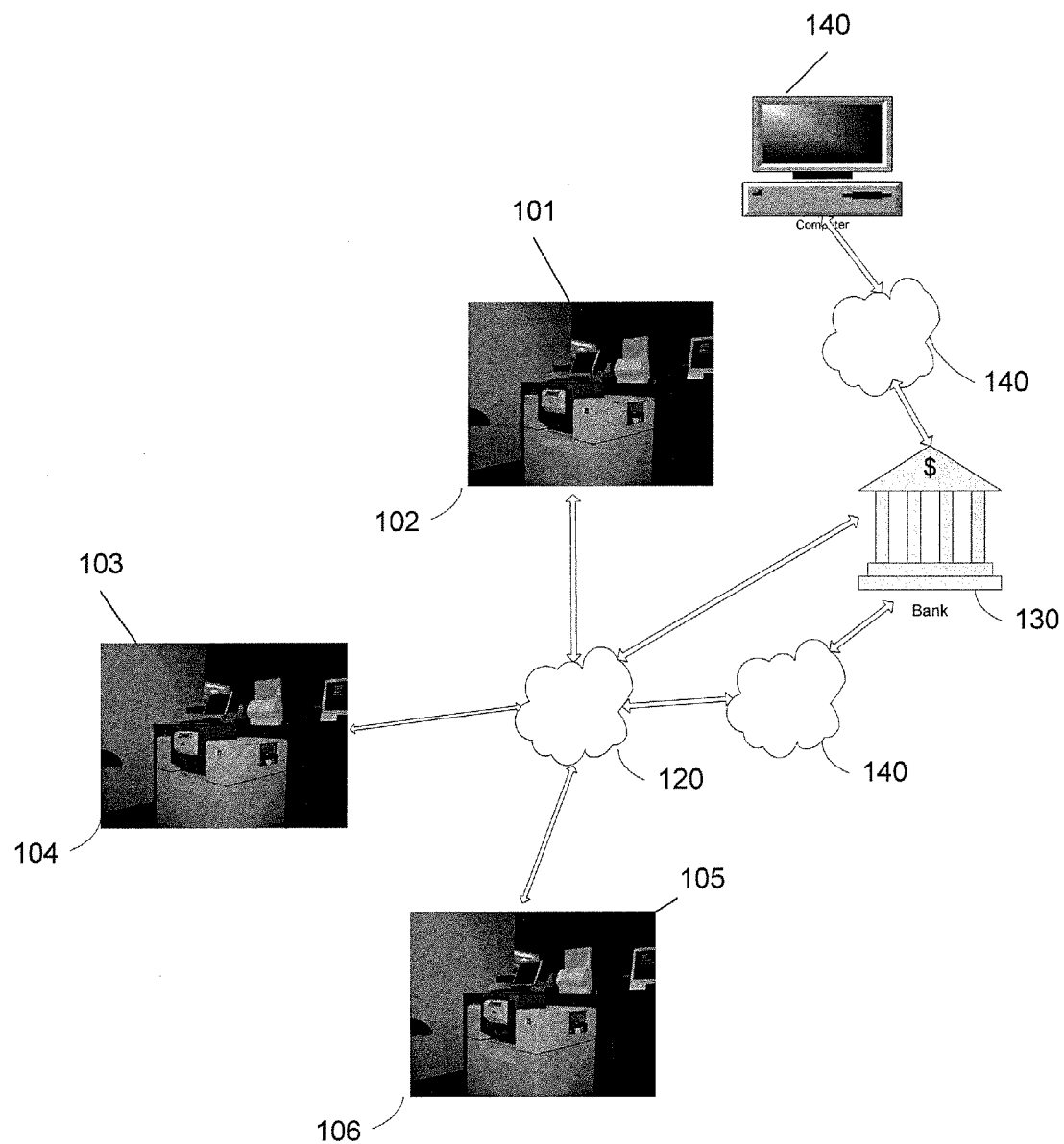
FIG. 1 illustrates an example of a suitable operating environment in which various aspects of the disclosure may be implemented.

FIG. 1 illustrates an example of a suitable operating environment in which various aspects of the disclosure may be implemented. Currency or cash recyclers 102, 104, 106 may be located at various locations such as locations 101, 103, and 105. The locations may represent different stores of a business enterprise. For example, locations 101, 103, and 105 may represent three different grocery stores located in different geographical areas belonging to a grocery chain. Those skilled in the art will realize that additional cash recyclers may be located in same stores or in other stores belonging to the grocery chain. In addition, those skilled in the art will realize that a grocery chain is only one illustrative example of the types of locations that cash recyclers may be located. For example, cash recyclers may also be located in gas stations, post offices, department stores, and other places where cash and other financial instruments are deposited or withdrawn.

FIG. 1 further illustrates that cash recyclers 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash recyclers 102, 104, and 106 may communicate with one another or with a financial institution such as bank 130 via communication network 120 in ways that are well known in the art. The existence of any of various well-known protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like may be used as the communications protocol. Communications network 120 may be directly connected to a financial institution such as bank 130. In another embodiment, communications network 120 may be connected to a second network or series of networks 140 such as the STAR network before being connected to bank 130.

Figure 2:
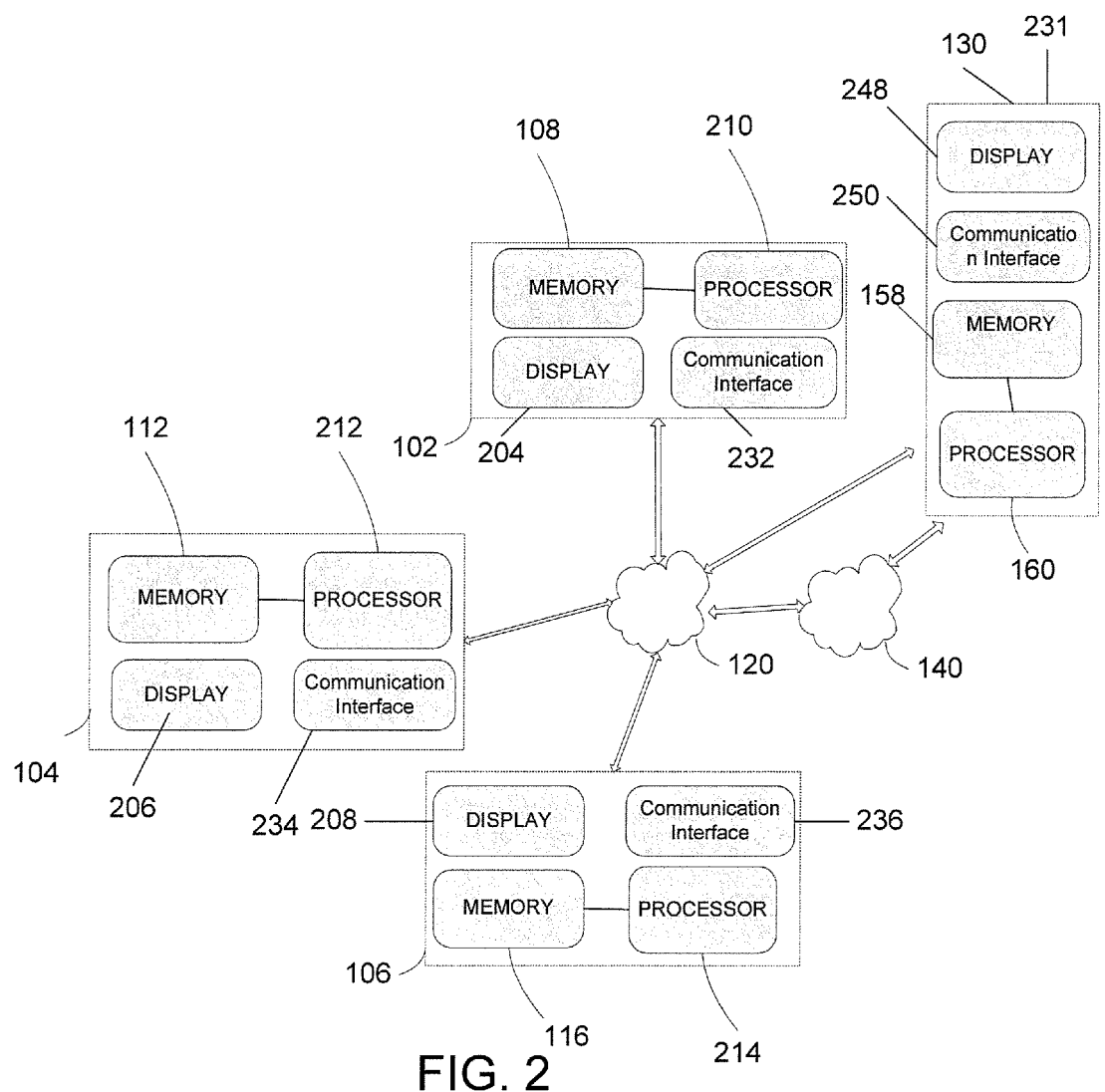
FIG. 2 illustrates a simplified diagram of a currency recycler in accordance with an aspect of the invention.

FIG. 2 illustrates a simplified diagram of a cash recycler in accordance with an aspect of the invention. Cash recyclers may comprise memories (108, 112, and 116) processors (210, 212, and 214), displays (204, 206, and 208), and communication interfaces (232, 234, and 236). The processors 210, 212, and 214 may execute computer-executable instructions present in memory 108, 112, 116 such that, for example, the cash recyclers 102, 104, and 106 may send and receive information to and from bank 130 via network or networks 120 and/or 140. Bank 130 may utilize an infrastructure which includes a server 231 having components such as memory 158, processor 160, display 248, and communication interface 250. The memory for each of the cash recyclers 102, 104, and 106 and server 231 may include non-volatile and/or volatile memory.

Figure 3:
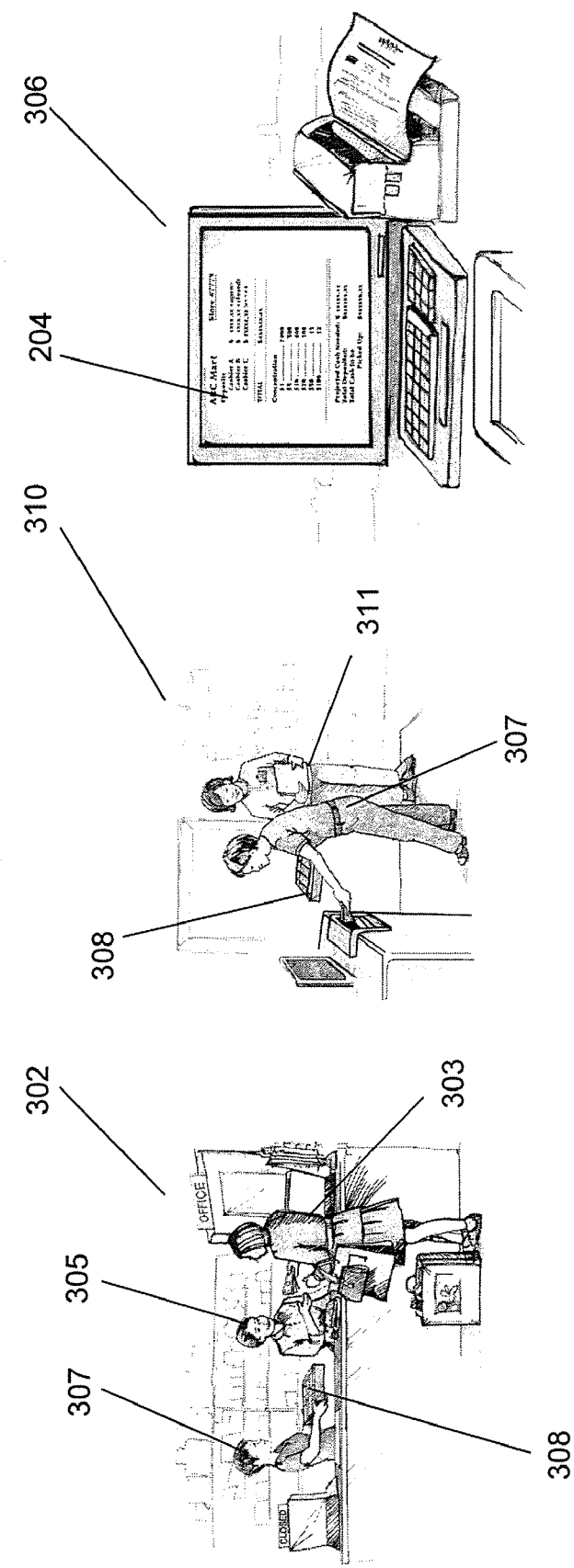
FIG. 3 illustrates various features of a currency recycler that may be used in accordance with aspects of the invention.

FIG. 3 illustrates various features of cash recycler 102 used in various aspects of the invention. The images in FIG. 3 depict use of a single cash recycler 102 in a retail environment. The retail owner may have a cash recycler 102 located in each of their stores. In an aspect of the invention, summary information for the retail owner's stores may be available via an interface to the financial institution. In another embodiment, access to summary information may be available directly from each of the cash recyclers 102.

In FIG. 3, image 302 depicts customer 303 paying cash to store cashier 305 for a purchase. Another store cashier 307 at a recently closed cash register may be carrying a cash drawer or till 308 to a back office for reconciliation. In image 310, store cashier 307 may load currency from cash register till 308 into cash recycler 102. In addition, store cashier 107 may also deposit other paper forms of payment received from customer such as checks. An office manager 311 may be supervising cashier 307 during the loading of cash register till 308 into cash recycler 102. Moreover, upon the start of a shift a cashier may fill his/her cash register till with a designated amount of currency dispensed from cash recycler 102.

In image 306 of FIG. 3, a display screen 204 of cash recycler 102 may show the total amount entered into cash recycler 102 from till 308. The display screen 204 may breakout the amount entered into cash recycler 102 by denomination and by each cashier. The total amount deposited and withdrawn from cash recycler 102 may be shown on display screen 204.

Figure 4:
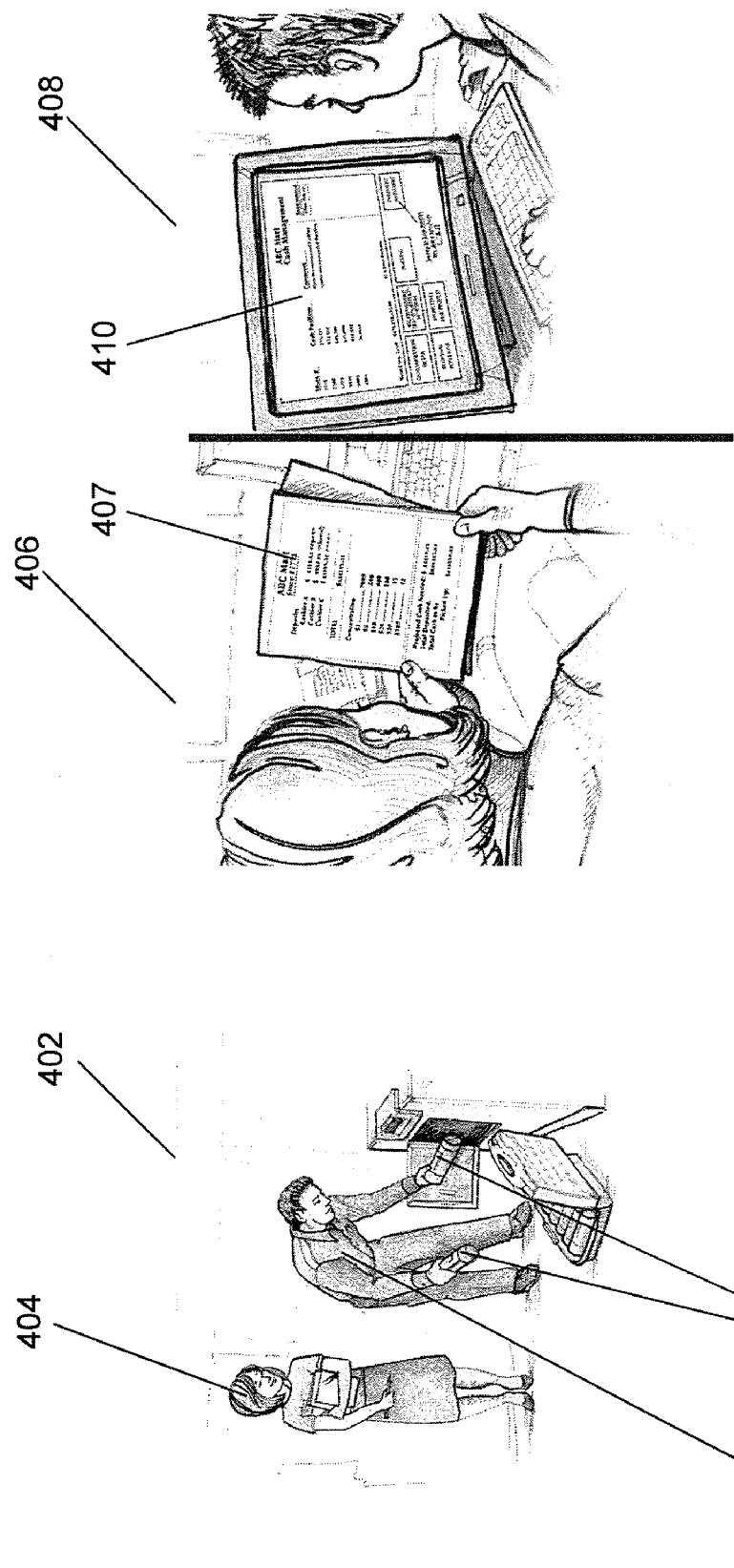
FIG. 4 illustrates additional features of a currency recycler used in various aspects of the invention.

FIG. 4 illustrates additional features of cash recycler 102 used in various aspects of the invention. In image 402 of FIG. 4, an armored car driver 403 may be delivering or picking up currency cylinders 405 from cash recycler 102. The currency cylinders may contain a predetermined amount of currency in various denominations to be used by cash recycler 102. As cash recycler 102 reuses currency that has been deposited via cashiers and/or other supervisory personnel for withdrawals, the frequency of armored car drop-offs of currency may be intermittent.

Image 406 illustrates reports 407 that may be generated showing various data such as the amount placed into cash recycler 102 along with the corresponding currency denominations. The reports 407 may also include information which may be used to determine when an armored car pickup should be scheduled.

The information stored in cash recycler 102 may be transmitted via network 120 to a financial institution for use in crediting or debiting various customer accounts. The retail customer may have access to the information through the financial institution's network. For example, image 408 depicts an enterprise employee accessing summary information concerning the businesses cash position as reported by the cash recyclers. The cash position of the enterprise may provide information to the enterprise employee directly via the interface or indirectly via another system authorize short term borrowing or investing, pay down credits lines, or request additional credit. Furthermore, the information may enable the enterprise employee to forecast future cash surpluses and shortages and/or perform other actives involving financial risk management.

Figure 5:
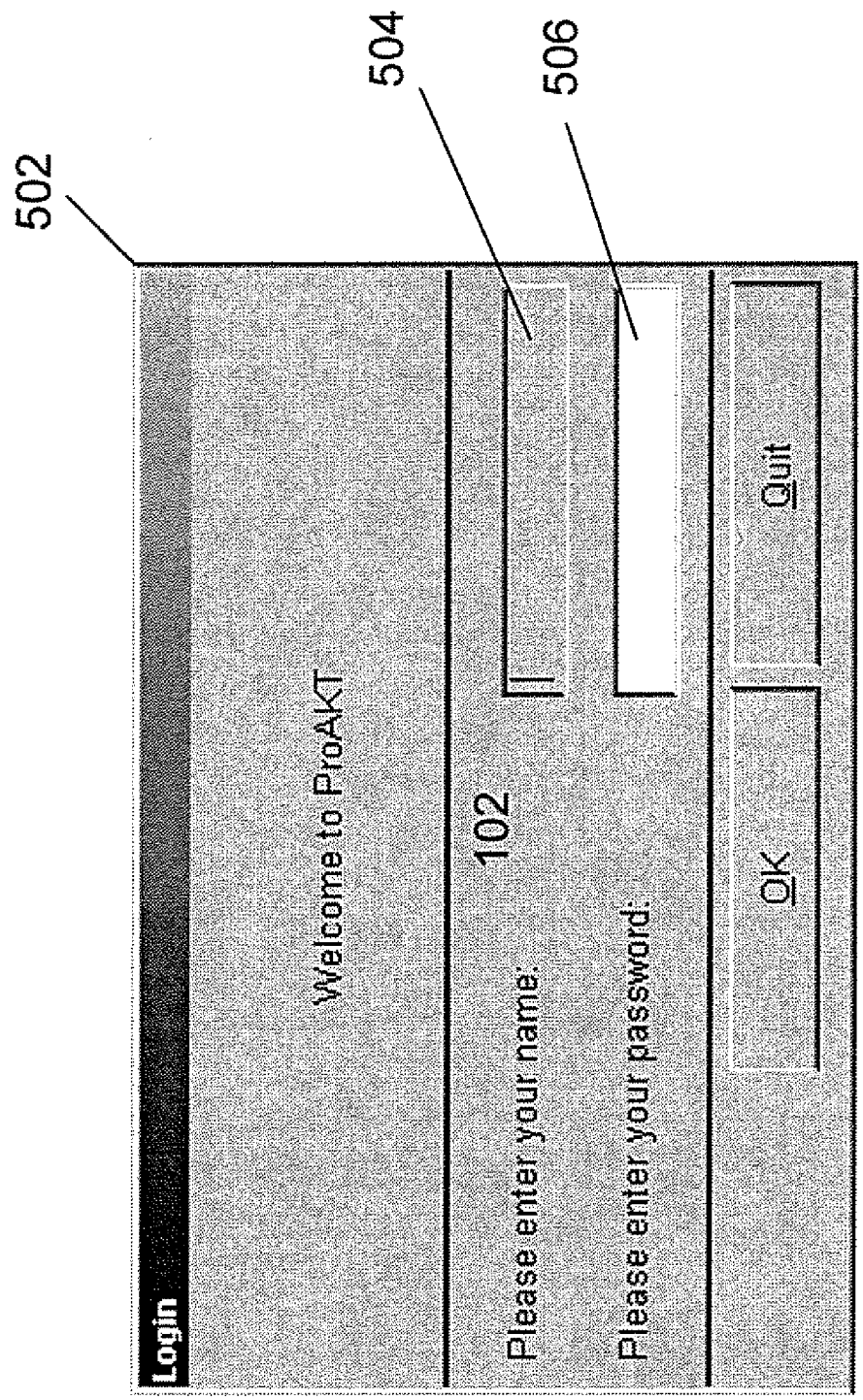
FIG. 5 illustrates an interface screen that may be utilized to access information regarding the current cash position of the enterprise in accordance with an aspect of the invention.

FIG. 5 illustrates an interface screen that an enterprise employee may utilize to access information regarding the current cash position of the enterprise in accordance with an aspect of the invention. In FIG. 5 an interface screen 502 may be used to request that a user enter a name 504 and password 506 to verify authorization to use the system. After access authorization has been granted the user is given access to the system.

Figure 6:
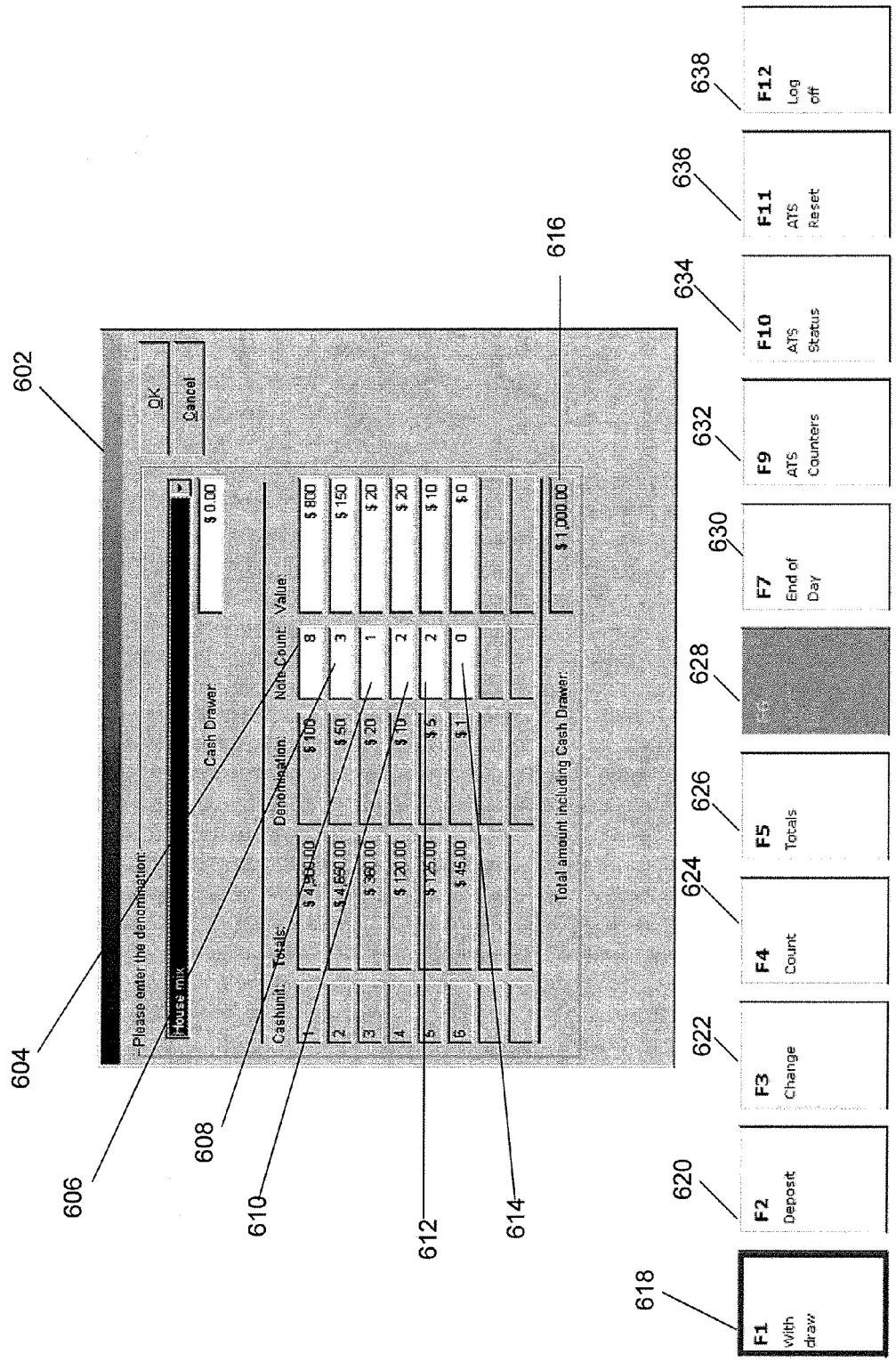
FIG. 6 illustrates a withdrawal screen that may be used in accordance with an aspect of the invention.

In an aspect of the invention, the user may decide to make a withdrawal to fill a cash register till. In FIG. 6, a withdrawal screen 602 may be presented to the user in accordance with an aspect of the invention. The user, through a series of drop-down boxes, may request that a certain total amount be withdrawn from the cash recycler in requested denominations. For example in screen 602, the user has requested that a total of $1,000 U.S. dollars 616 be withdrawn from cash recycler 102. The user has further requested that the cash recycler 102 dispense the $1,000 dollars in the form of eight $100 dollar bills (604), three $50 dollar bills (606), one $20 dollar bill (608), two $10 dollar bills (610) and two $5 dollar bills (612). Upon entry of the appropriate amount the user may select button 618 or shortcut key F1 to initiate the withdrawal. After the currency has been dispensed by the cash recycler 102, the cash recycler 102 may communicate with the financial institution or bank 130 to debit the appropriate enterprise accounts.

As shown in withdrawal screen 602 additional buttons or short cut keys corresponding to different functions may be displayed to the user. For example, the buttons may include a "Deposit" button 620, a "Change" button 622, a "Count" 624, a "Totals" button 626, a "Start Day" button 628, an "End of Day" button 630, an "ATS Counters" button 632, an "ATS Status" button 634, an "ATS Reset" button 636, and a "Log off" button 638.

Figure 7:
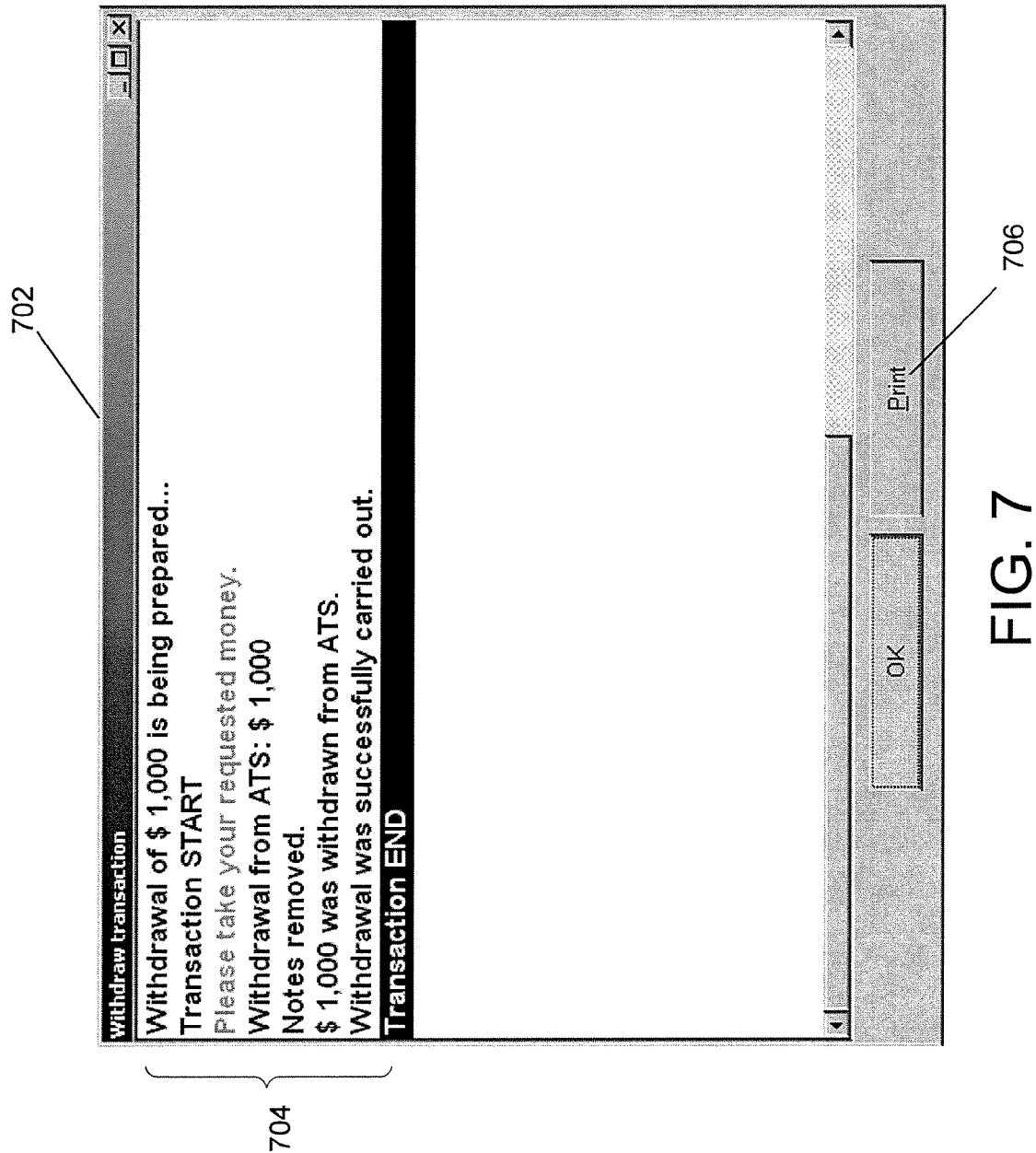
FIG. 7 illustrates a user interface screen in accordance with an aspect of the invention.

When the currency has been dispensed from the cash recycler 102, a displayed receipt may be shown to the user. For example, FIG. 7 illustrates a user screen 702 listing details in the form of receipt 704 for viewing by the user in accordance with an aspect of the invention. The user may request that the displayed receipt be printed 706.

In another aspect of the invention, the user may deposit a cash register till into cash recycler 102. The user may first count the currency and enter the amount into the cash recycler 102. The cash recycler may tally the currency as it is being deposited and also check for potential counterfeit currency. After entry of the contents of the till into the cash recycler 102, the amount entered by the user may be compared to the amount counted by cash recycler 102. If the amounts are equal, the cash recycler 102 may communicate with the financial institution or bank 130 to credit the appropriate enterprise accounts. If a discrepancy exists, the user may be prompted to verify their count or a supervisor may be requested to intervene. Upon resolution, the cash recycler 102 may communicate with the financial institution or bank 130 to credit the appropriate enterprise account.

Figure 8:
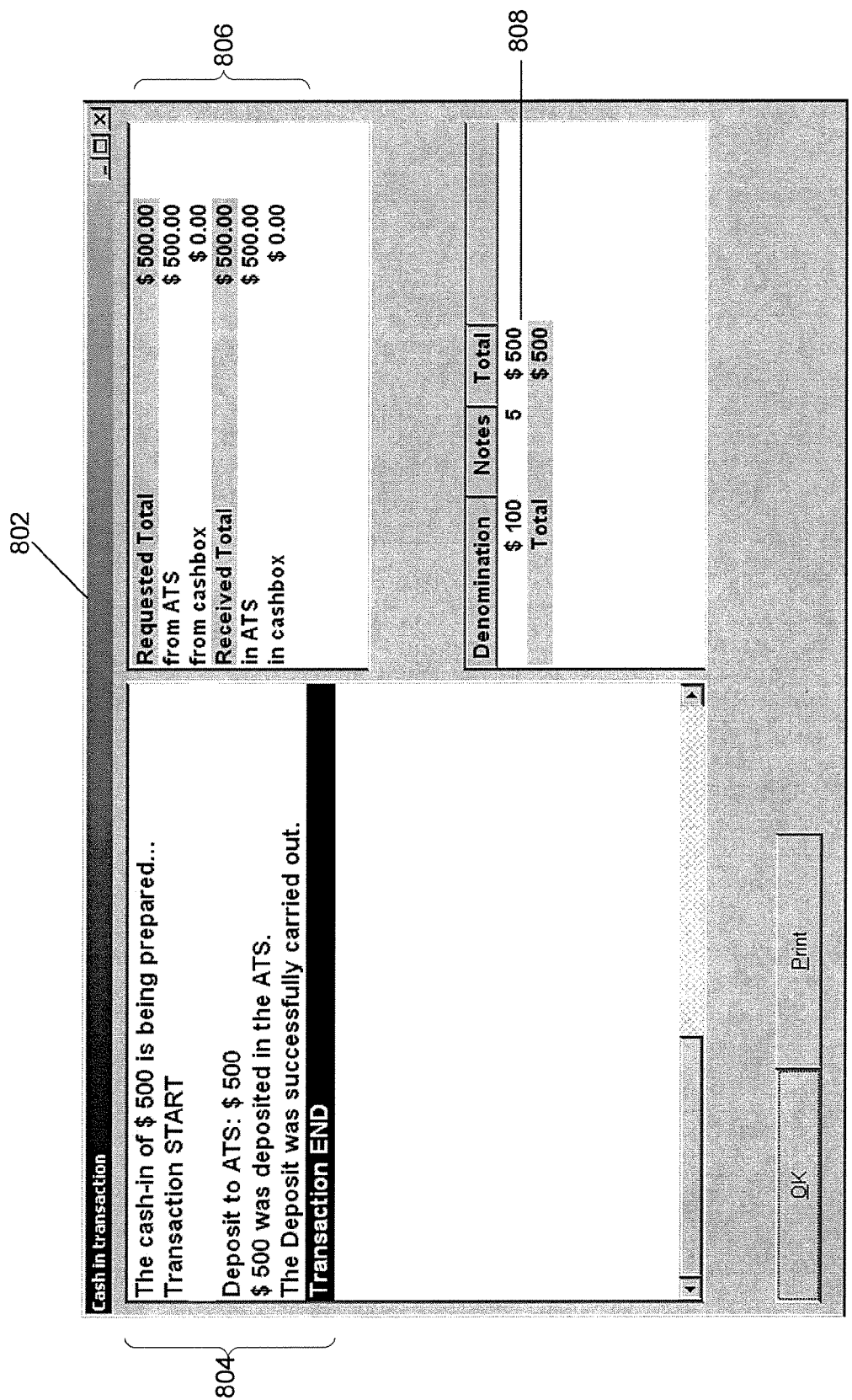
FIG. 8 illustrates another user interface screen that may be used in accordance with an aspect of the invention.

FIG. 8 illustrates a user screen 802 listing details for viewing by the user in accordance with an aspect of the invention. For example, user screen 802 may provide details of the transaction 804 along with detailed source amount information 806 and a breakdown of the currency denominations 808.

In another aspect of the invention, the currency recycler 102 may also provide an inventory report 904 of the currency denominations 906 available to be dispensed upon request as illustrated in FIG. 9. The information may also include other types of currency currently available to be dispensed by cash recycler 102 such as foreign currency.

Figure 10:
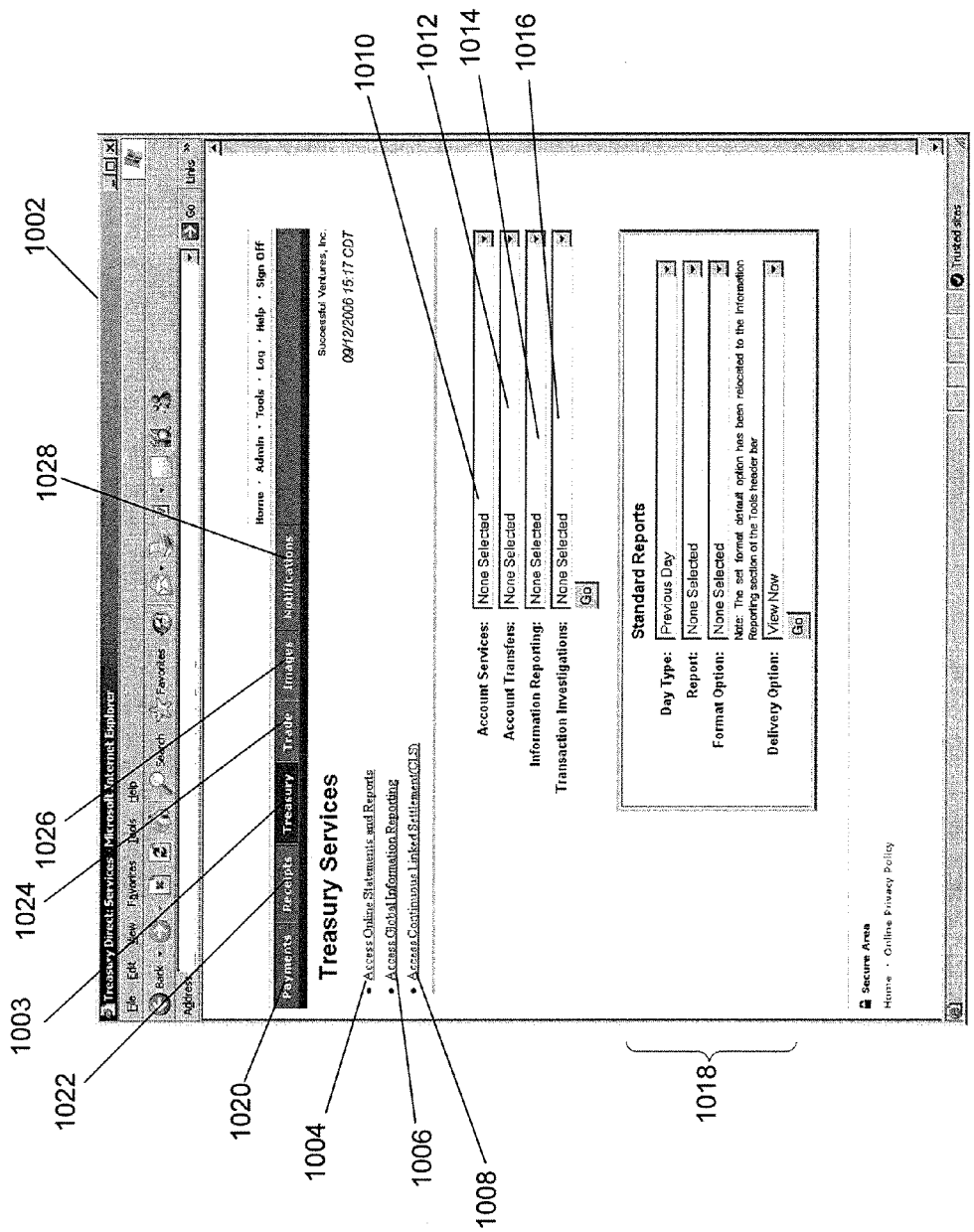
FIG. 10 illustrates a cash balance interface screen that may be used in accordance with an aspect of the invention.

FIG. 10 illustrates an interface screen, which may be used by an enterprise user to review cash balances at each of their stores or locations in accordance with an aspect of the invention. As shown in image 1002, the user may tab to a treasury screen 1003. The treasury screen 1003 may include a link to access online statements and reports 1004, global information reporting 1006 and continuous linked statements 1008. The user may have the ability to select a particular account service 1010, make an account transfer 1012, initialize information reporting 1014, and/or initialize a transaction investigation 1016.

In another aspect of the invention, standard reports 1018 may be available for review by the user. Additional detailed information may also be available by selecting different tabs such as a "Payments" tab 1020, a "Receipts" tab 1024, a "Trade" tab 1026, and a "Notification" tab 1028.

Figure 11:
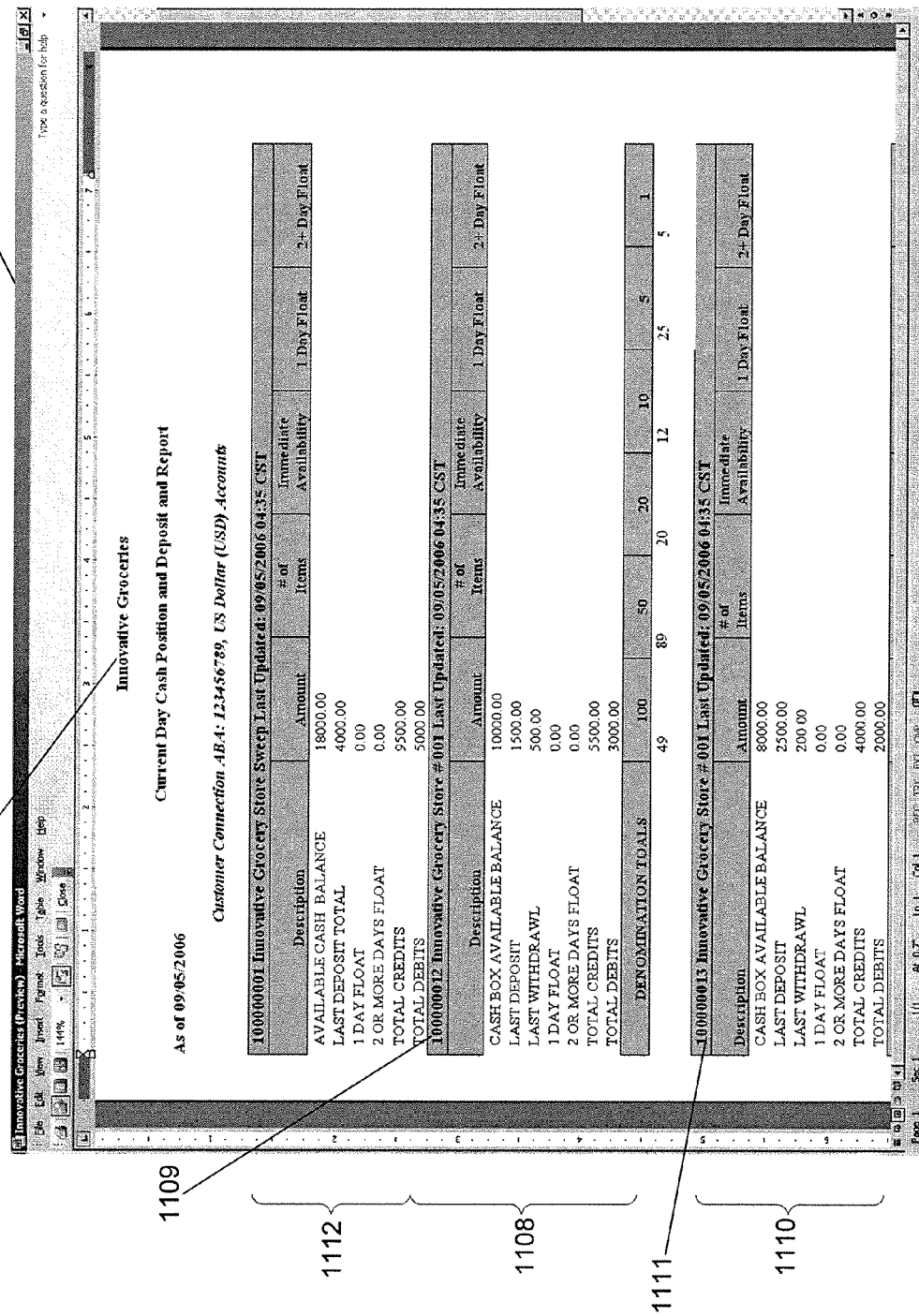
FIG. 11 illustrates a report that may be generated in accordance with an aspect of the invention.

FIG. 11 illustrates a report that may be generated in accordance with an aspect of the invention. In FIG. 11, a report is illustrated in image 1102. For example, the report may be for a grocery chain called "Innovative Groceries" 1104. The report may provide the user with the current day cash position for the grocery chain. For example, image 1102 illustrates a report which shows information 1108 and 1110 relating to cash positions at two stores 1109 and 1111. A total cash position for the grocery chain may also be provided along with other information at 1112.

The prompt recognition and acknowledgement of cash receipts may enable the enterprise to use the information to provide better funds management. For instance, the enterprise may decide to invest or pay down short term revolvers. Alternatively the enterprise may use the information to improve or mange cash change orders. The information may also be used in estimating and predicting future needs for lines of credit or in estimating future cash surpluses and/or shortages.

Figure 12:
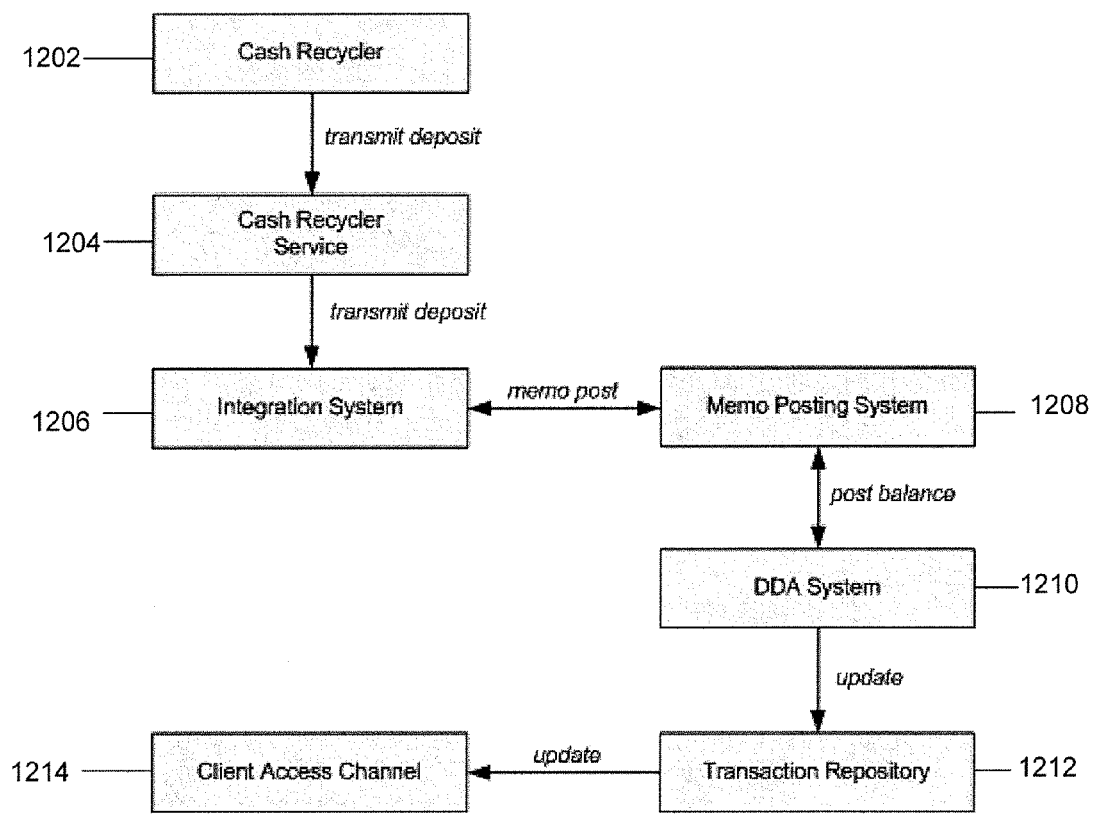
FIG. 12 illustrates a system configuration that may be used in accordance with an aspect of the invention.

FIG. 12 illustrates a system configuration that may be used in accordance with an aspect of the invention. In FIG. 12 a cash recycler 1202 may communicate information to cash recycler service 1204 located at a remote location. For example, cash recycler 1202 may communicate deposit and withdrawal information from an enterprise location to the remote cash recycler service 1204. The information may be routed through various networks such as the Internet to reach the cash recycler service. The cash recycler service 1204 may be located in the data center of a financial institution. The cash recycler service 1204 may communicate with an integration system 1206 which provides access to the financial systems and processes. The integration system 1206 may communicate with a memo posting system 1208 which may perform posting activity. The posting system 1208 may update the appropriate DDA (direct deposit account) system 1210 to reflect the balance changes in the enterprises account balances. The DDA system 1210 may also update a transaction repository 1212 for historical and intra-day reporting purposes. An enterprise employee may access information stored in the transaction repository 1212 through a client access channel 1214 via web browser. Those skilled in the art will realize that the financial institution may allow the enterprise user to access the information stored in the transaction repository via numerous alternative communication methods.

Figure 13:
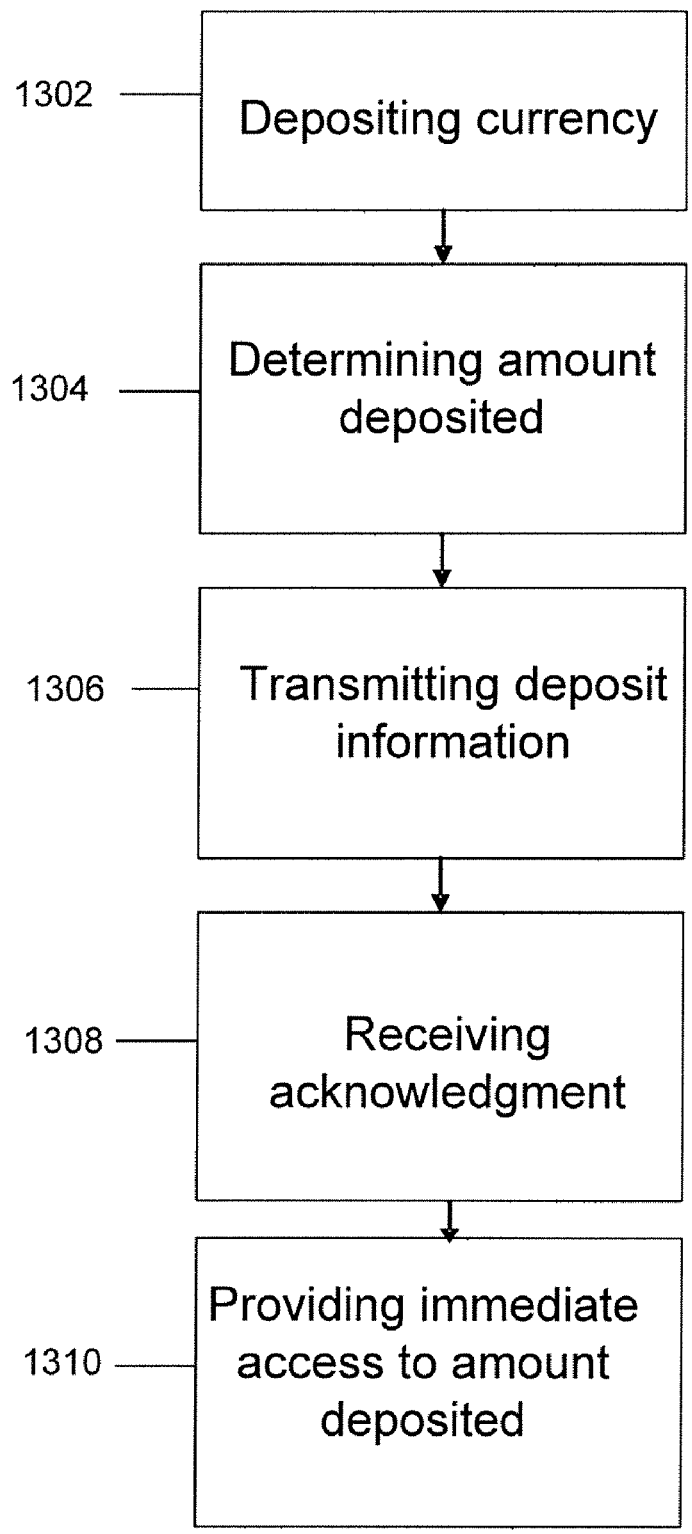
FIG. 13 illustrates a method of providing immediate availability to amount deposited in accordance with an aspect of the invention.

FIG. 13 illustrates a method of providing immediate credit to amount deposited in accordance with an aspect of the invention. In step 1302, an enterprise employee may deposit a first amount of currency in a cash recycler. The cash recycler may accept different forms of currency including bills, coins, and checks. The cash recycler in step 1304 may determine the amount of currency deposited by the enterprise employee. The cash recycler may query the enterprise employee to acknowledge the determined amount of currency to be deposited before proceeding. In step 1306, the cash recycler may transmit information relating to the amount of currency deposited to a financial institution. The financial institution upon receipt of the transmitted information may access the account of the enterprise and update the balance by the amount of the deposit. The financial institution may transmit an acknowledgement that the enterprise account has been updated. In step 1308, the cash recycler may receive an acknowledgement of the deposit. In step 1310, the enterprise may have immediate availability to the amount deposited to the account.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method of currency handling, comprising:
   receiving, in a deposit transaction, an amount of currency in a machine from a depositor at a location remote from a financial institution;
   determining the amount of currency deposited in the machine;
   transmitting, to the financial institution, a request for real-time recognition of the amount deposited, the request including information relating to the amount of currency deposited; and
   in response to the transmission of the request, receiving an acknowledgement from the financial institution that the amount deposited has been recognized, wherein recognition includes a non-provisional credit of the amount deposited to an account of the depositor with the financial institution prior to removal of the amount of currency from the location remote from the financial institution, and wherein a finality of the non-provisional credit is not conditioned on a verification of the deposit transaction by the financial institution.

2. The method of claim 1, wherein the machine comprises a cash recycler.

3. The method of claim 2, wherein the cash recycler uses the deposited currency for future withdrawals.

4. The method of claim 1, wherein the method further comprises determining if any of the currency deposited in the machine includes counterfeit currency.

5. The method of claim 1, wherein the acknowledgment is received prior to funds associated with the currency deposited being received by the financial institution.

6. The method of claim 1, wherein the request is generated automatically by the machine.

7. A method of currency handling, comprising:
   receiving, at a financial institution, first deposit information of a first amount of currency from a first machine located in a first location remote from the financial institution;
   receiving, at the financial institution, second deposit information of a second amount of currency from a second machine located in a second location remote from the financial institution;
   accessing an account of a depositor of the first and second amounts of currency, wherein the account is with the financial institution; and
   providing real-time recognition of the first and second amounts of currency including providing a non-provisional credit of the first amount of currency and the second amount of currency to the account prior to removal of the first and second amounts of currency from the first and second locations, respectively, wherein a finality of the non-provisional credit is not conditioned on a verification of the first and second deposit information by the financial institution.

8. The method of claim 7, further comprising determining, at the financial institution, a real-time cash position of the depositor at each of the first and second locations, wherein the real-time cash position specifies a total amount of currency available at the first location and a total amount of currency available at the second location.

9. The method of claim 7, wherein the first and second machines each comprise a cash recycler.

10. The method of claim 9, wherein the cash recycler uses the first and second deposited currency for future withdrawals.

11. The method of claim 7, wherein the method further comprises determining if the first and second deposited currencies include counterfeit currency.

12. The method of claim 7, wherein providing real-time recognition of the first and second amounts of currency further includes providing immediate availability to the first and second amounts of currency added to the account.

13. The method of claim 12, wherein immediate access to the first and second amounts of currency comprises access from a third location different from the first and second locations.

14. A system for providing currency handling, the system comprising:
   a first machine located at a first location, the first machine comprising a first memory and a first processor, wherein the first processor executes computer-executable instructions in the first memory for:
      receiving a first amount of currency deposited in the first machine;
      determining the first amount of currency deposited in the first machine; and
      transmitting information relating to the first amount of currency deposited;
   a second machine located at a second location, the second machine comprising a second memory and a second processor, wherein the second processor executes computer-executable instructions in the second memory for:
      receiving a second amount of currency deposited in the second machine;
      determining the second amount of currency deposited in the second machine; and
      transmitting information relating to the second amount of currency deposited; and
   a computer apparatus located at a third location different from the first and second locations, the computer apparatus comprising a third memory and a third processor, wherein the third processor executes computer-executable instructions in the third memory for:
      receiving information relating to the first and second amounts;
      accessing an account of a depositor;
      providing real-time recognition of the first and second amounts including providing anon-provisional credit of the first amount and the second amount to the account of the depositor prior to removal of the first and second amounts of currency from the first and second locations, respectively, and wherein a finality of the non-provisional credit is not conditioned on a verification of deposit information corresponding to the deposited first and second amounts of currency by a financial institution; and providing information including a real-time cash position of the depositor, wherein the real-time cash position specifies a total amount of cash of the depositor available at the first location and a total amount of cash of the depositor available at the second location.

15. The system of claim 14, wherein the information regarding the real-time cash position is used to estimate future cash surpluses or shortages.

16. The system of claim 14, wherein the information regarding the real-time cash position of the depositor is used pay down debt.

17. The system of claim 14, wherein the information regarding the real-time cash position of the depositor is to manage change orders.

18. The system of claim 14, the information regarding the real-time cash position of the depositor is used for investment decisions.

19. The system of claim 14, wherein the first and second machines comprise cash recyclers.

20. The system of claim 14, wherein the third location comprises a financial institution.

21. The system of claim 14, wherein the first and second locations comprise enterprise locations.

22. A method comprising:
receiving, at a financial institution, real-time information corresponding to a deposit of an amount of currency at a remote device, wherein the real-time information identifies an account of a depositor with the financial institution to which the amount of currency is to be deposited; and in response to receiving the real-time information, immediately recognizing, by the financial institution, the amount of currency deposited including adding the amount of currency deposited to the account of the depositor, wherein immediately recognizing the amount of currency includes providing a non-provisional credit of the amount of currency to the account of the depositor prior to receipt of the deposited amount of currency at the financial institution, and wherein a finality of the non-provisional credit is not conditioned on a verification of the deposit by the financial institution.

23. The method of claim 22, wherein providing the non-provisional credit of the amount of currency to the account of the deposit is performed prior to removal of the deposited amount of currency from a location of the remote device.

24. The method of claim 22, wherein the remote device is a cash recycler.

25. The method of claim 22, further comprising determining a real-time cash position of the depositor including determining a total amount of cash available to the depositor at a first location and determining a total amount of cash available to the depositor at a second location.

26. An apparatus comprising:
a processor; and
memory storing computer readable instructions that, when executed, cause the processor to perform a method comprising:

receiving a deposit of an amount of currency in the apparatus from a depositor at a location remote from a financial institution;

determining the amount of currency deposited in the apparatus;

transmitting, to the financial institution, a request for real-time recognition of the amount deposited, the request including information relating to the amount of currency deposited; and in response to the transmission of the request, receiving an acknowledgement from the financial institution that the amount deposited has been recognized, wherein recognition includes a non-provisional credit of the amount deposited to an account of the depositor with the financial institution, wherein the acknowledgment is received prior to the deposited currency being removed from the remote location and wherein a finality of the non-provisional credit is not conditioned on a verification of the deposit by the financial institution.

27. The apparatus of claim 26, wherein the acknowledgment is received prior to funds associated with the currency deposited being received by the financial institution.

28. The apparatus of claim 26, wherein the request is generated automatically by the apparatus.

29. An apparatus comprising:
a processor; and
memory storing computer readable instructions that, when executed, cause the processor to perform a method comprising:

receiving, at a financial institution, real-time information corresponding to a deposit of an amount of currency at a remote device, wherein the real-time information identifies an account of a depositor with the financial institution to which the amount of currency is to be deposited; and in response to receiving the real-time information, immediately recognizing, by the financial institution, the amount of currency deposited including adding the amount of currency deposited to the account of the depositor, wherein immediately recognizing the amount of currency includes providing a non-provisional credit of the amount of currency to the account of the depositor prior to receipt of the deposited amount of currency at the financial institution, and wherein a finality of the non-provisional credit is not conditioned on a verification of the deposit by the financial institution.

30. The apparatus of claim 29, wherein recognizing the amount of currency deposited is performed prior to funds associated with the currency deposited being removed from a location of the remote device.

31. The apparatus of claim 29, wherein the remote device is a cash recycler.

32. The apparatus of claim 29, the memory further storing instructions for determining a real-time cash position of the depositor including determining a total amount of cash available to the depositor at a first location and determining a total amount of cash available to a depositor at the second location.

* * * * *

UNITED STATES PATENT AND TRADEMARK OFFICE
CERTIFICATE OF CORRECTION

| | | |
|---|---|---|
| PATENT NO. | : 7,635,085 B2 | Page 1 of 1 |
| APPLICATION NO. | : 11/614656 | |
| DATED | : December 22, 2009 | |
| INVENTOR(S) | : Brown et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 0 days Delete the phrase "by 0 days" and insert -- by 20 days --

Column 8, Claim 14, Line 65:
    Please delete "anon-provisional" and insert --a non-provisional--.

Signed and Sealed this

Third Day of August, 2010

David J. Kappos
*Director of the United States Patent and Trademark Office*